(12) United States Patent
Doherty et al.

(10) Patent No.: US 9,107,195 B2
(45) Date of Patent: Aug. 11, 2015

(54) METHOD OF VALIDATING 1X PACKET AVAILABILITY IN A VEHICLE TELEMATICS UNIT

(75) Inventors: James Doherty, Wyandotte, MI (US); Ki Hak Yi, Windsor (CA)

(73) Assignee: General Motors, LLC, Detroit, MI (US)

( * ) Notice: Subject to any disclaimer, the term of this patent is extended or adjusted under 35 U.S.C. 154(b) by 1234 days.

(21) Appl. No.: 12/963,940

(22) Filed: Dec. 9, 2010

(65) Prior Publication Data
US 2012/0147863 A1 Jun. 14, 2012

(51) Int. Cl.
*H04L 29/08* (2006.01)
*H04W 76/02* (2009.01)
*H04W 4/04* (2009.01)
*H04W 4/20* (2009.01)

(52) U.S. Cl.
CPC ............. *H04W 76/025* (2013.01); *H04L 67/12* (2013.01); *H04W 4/046* (2013.01); *H04W 4/20* (2013.01)

(58) Field of Classification Search
CPC ...... H04L 67/12; H04W 4/046; H04W 4/023; H04W 4/16; H04W 60/00; H04W 88/16; H04W 8/22
USPC .................................................. 370/352–356
See application file for complete search history.

(56) References Cited

U.S. PATENT DOCUMENTS

| | | | |
|---|---|---|---|
| 2004/0064550 A1* | 4/2004 | Sakata et al. | 709/224 |
| 2005/0049021 A1* | 3/2005 | Nedelcu et al. | 455/575.9 |
| 2005/0065779 A1* | 3/2005 | Odinak | 704/201 |
| 2005/0105509 A1* | 5/2005 | Crocker et al. | 370/352 |
| 2006/0039367 A1* | 2/2006 | Wright et al. | 370/382 |
| 2006/0114890 A1* | 6/2006 | Martin Boys | 370/352 |
| 2009/0190572 A1* | 7/2009 | Chang | 370/350 |

\* cited by examiner

*Primary Examiner* — Khaled Kassim
(74) *Attorney, Agent, or Firm* — Anthony Luke Simon; Reising Ethington P.C.

(57) ABSTRACT

A method of communicating with a telematics-equipped vehicle includes receiving a circuit-switched telephone call at a central facility from a telematics-equipped vehicle via a wireless carrier system that is in local communication with the telematics-equipped vehicle; determining during the circuit-switched telephone call that a separate packet-data communication session between the telematics-equipped vehicle and the central facility is desired; identifying the wireless carrier system that is in local communication with the telematics-equipped vehicle; querying the identified wireless carrier system from the central facility to determine whether the telematics-equipped vehicle is authorized to establish a packet-data communication session using the identified wireless carrier system; if so, obtaining an Internet protocol (IP) address from the identified wireless carrier system; and commencing the exchange of data between the telematics-equipped vehicle and the central facility using the obtained IP address.

15 Claims, 2 Drawing Sheets

METHOD OF VALIDATING 1X PACKET AVAILABILITY IN A VEHICLE TELEMATICS UNIT

TECHNICAL FIELD

The present invention relates generally to vehicles and more particularly to communication with telematics-equipped vehicles.

BACKGROUND OF THE INVENTION

Vehicle manufacturers outfit their vehicles with an increasing number of wireless communications capabilities. Telematics units installed in modern vehicles can wirelessly communicate both voice and data communications between the vehicle and a variety of recipients, such as a central facility. However, vehicles are inherently mobile and designed to travel great distances. While the vehicle could regularly operate in a geographic area where the vehicle or central facility knows that voice and data communications are supported, it is possible that the vehicle could travel to an area where the vehicle or the central facility is unsure whether or not communications with the vehicle is possible. As a result, it may be helpful to determine if communications are possible.

SUMMARY OF THE INVENTION

According to an aspect of the invention, there is provided a method of communicating with a telematics-equipped vehicle. The method includes receiving a circuit-switched telephone call at a central facility from a telematics-equipped vehicle via a wireless carrier system that is in local communication with the telematics-equipped vehicle; determining during the circuit-switched telephone call that a separate packet-data communication session between the telematics-equipped vehicle and the central facility is desired; identifying the wireless carrier system that is in local communication with the telematics-equipped vehicle; querying the identified wireless carrier system from the central facility to determine whether the telematics-equipped vehicle is authorized to establish a packet-data communication session using the identified wireless carrier system; if so, obtaining an Internet protocol (IP) address from the identified wireless carrier system; and commencing the exchange of data between the telematics-equipped vehicle and the central facility using the obtained IP address.

According to another aspect of the invention, there is provided a method of communicating with a telematics-equipped vehicle. The method includes placing a circuit-switched telephone call from a telematics-equipped vehicle to a central facility via a wireless carrier system that is in local communication with the telematics-equipped vehicle; determining during the circuit-switched telephone call that a separate packet-data communication session between the telematics-equipped vehicle and the central facility is desired; obtaining an identifier at the telematics-equipped vehicle from a local component of the wireless carrier system; transmitting the obtained identifier from the telematics-equipped vehicle to the central facility via the circuit-switched telephone call; receiving an Internet protocol (IP) address at the telematics-equipped vehicle that was obtained as a result of the central facility determining that the wireless carrier system authorized packet data communications between the telematics-equipped vehicle and the central facility; and commencing the exchange of data between the telematics-equipped vehicle and the central facility using the received IP address.

According to yet another aspect of the invention, there is provided a method of communicating with a telematics-equipped vehicle. The method includes receiving a circuit-switched telephone call at a central facility from a telematics-equipped vehicle via a wireless carrier system that is in local communication with the telematics-equipped vehicle; determining during the circuit-switched telephone call that a separate packet-data communication session between the telematics-equipped vehicle and the central facility is desired; obtaining a system identification number (SID) or a network identification number (NID) at the telematics-equipped vehicle from a local component of the wireless carrier system; transmitting the SID or NID from the telematics-equipped vehicle to the central facility via the circuit-switched telephone call; identifying the wireless carrier system at the central facility based on the transmitted SID or NID; transmitting the identity of the telematics-equipped vehicle to the identified wireless carrier system from the central facility along with a request to establish a packet-data communication session using the identified wireless carrier system; receiving an Internet protocol (IP) address from the identified wireless carrier system that is generated as a result of permitting the request; and commencing the exchange of data between the telematics-equipped vehicle and the central facility using the obtained IP address.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
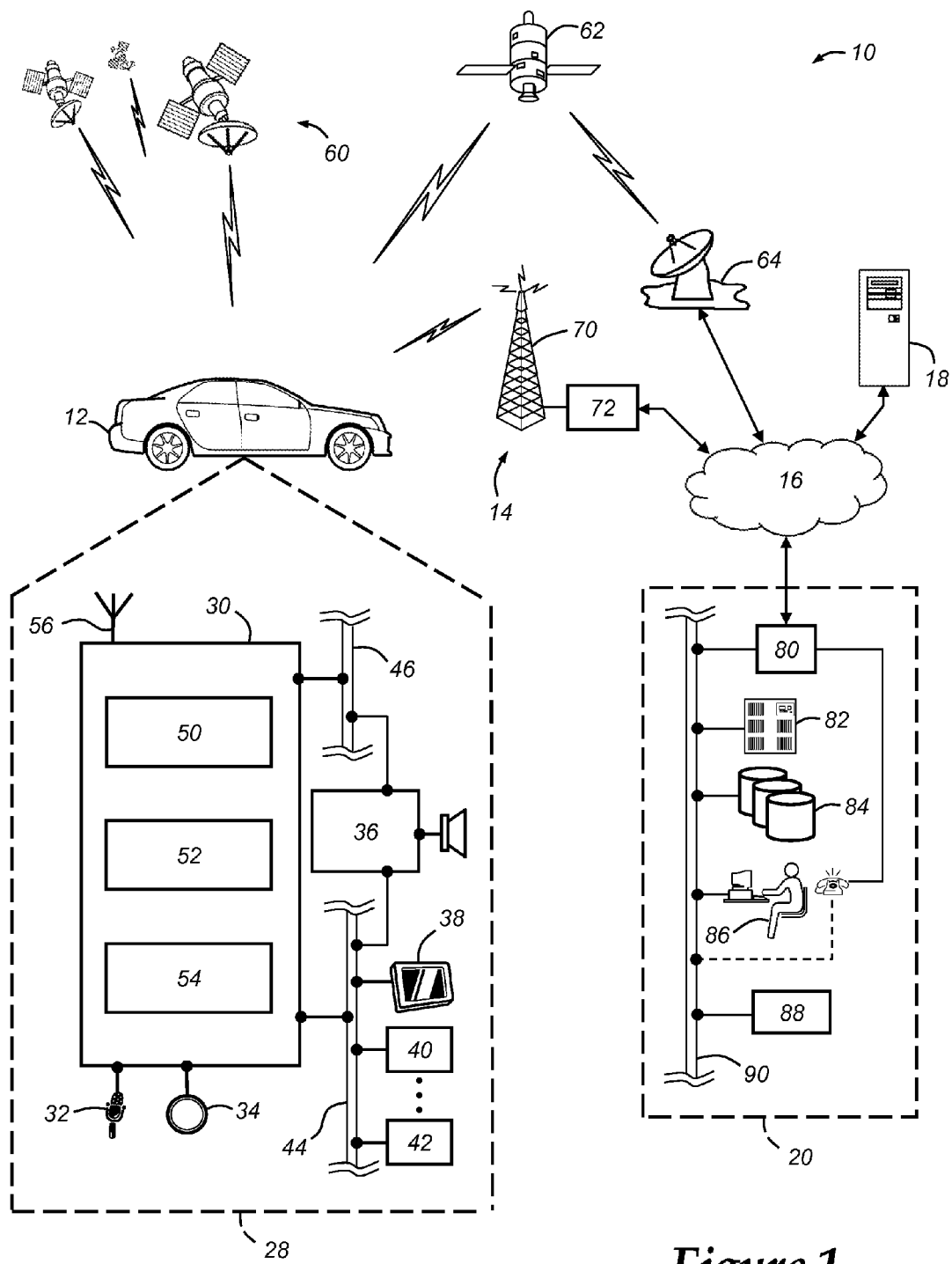
FIG. 1 is a block diagram depicting an exemplary embodiment of a communications system that is capable of utilizing the method disclosed herein.

The method described below determines whether or not a vehicle can communicate using data packets via a particular wireless carrier system. When a vehicle travels or roams from its home wireless carrier system, it may come in contact or communicate with a number of other wireless carrier systems. And it is not always immediately clear whether the vehicle, or more particularly the telematics unit of the vehicle, is authorized to send and receive data transmissions using these other wireless carrier systems. This can be somewhat disruptive for the central facility that may want to communicate data with the vehicle but also may not want to do so unless it can know or determine that communication is possible. In that sense, the central facility may not want to waste the data transmission costs associated with needlessly transmitting data if the vehicle is not authorized to receive it. However, it can be determined that data packet communication is possible by using a circuit-switched telephone call between the central facility and the vehicle. During that circuit-switched call, the central facility can receive information from the vehicle that identifies both the vehicle and the wireless carrier system where the vehicle is located. Using that information, the central facility can contact the identified wireless carrier system and ask it whether or not packet-data communication is authorized for that vehicle. If the identified wireless carrier system permits packet-data communication with the vehicle, it can provide an Internet protocol (IP) address for the vehicle to communicate with. That IP address can be provided to the vehicle and used to communicate with the vehicle via a packet-data communication session.

In other systems, the vehicle could maintain a list of wireless carrier systems and data used for communicating through those systems, such as a preferred roaming list or a packet data availability table. However, the information included with the list of wireless carrier systems may quickly become obsolete and updating this list could involve significant resources and even then would provide no assurance that at any particular time that list would be accurate for any particular wireless carrier system. Instead, a method of communicating with the telematics unit in which the information used to communicate through a particular wireless carrier system can be provided during a circuit-switched call can benefit from the most up-to-date information. That is, packet data communications between the vehicle and the central facility through the particular wireless carrier system can be authorized in real time without using authentication data pre-saved at the vehicle. Furthermore, using the list or packet data availability table saved at the vehicle does not provide any indication of the relative availability of a particular wireless carrier system. For instance, even if the vehicle maintains a list of information used to communicate via a particular wireless carrier system, nothing in the list can predict the health or availability of that system at any given time. In contrast, once the central facility can obtain the identity of the vehicle and that of the particular wireless carrier system, it can then contact that wireless carrier system to not only determine if the vehicle is authorized to communicate but also to determine if that particular wireless carrier system or a portion of that system is available and capable of supporting communications at that time.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
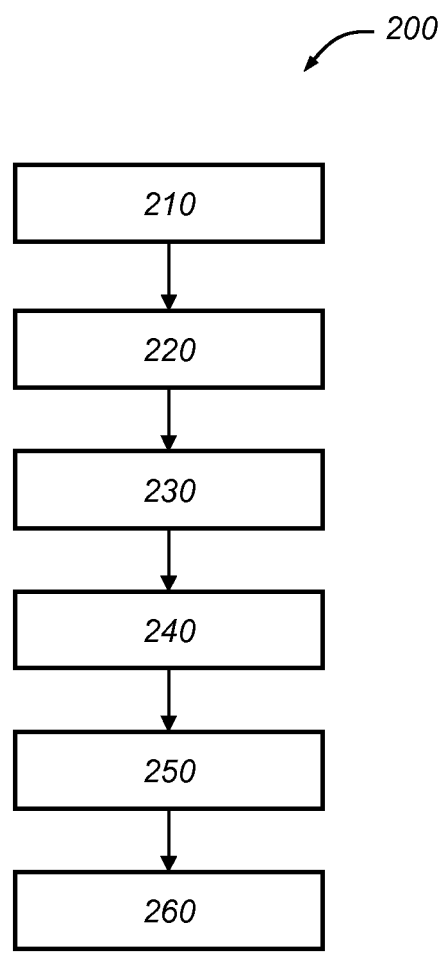
FIG. 2 is a flow chart of one method of communicating with a telematics-equipped vehicle.

Turning now to FIG. 2, there is shown a method 200 of communicating with a telematics-equipped vehicle. The method 200 begins at step 210 by placing a circuit-switched telephone call from a telematics-equipped vehicle 12 and/or receiving a circuit-switched telephone call at a central facility via a wireless carrier system 14 that is in local communication with the telematics-equipped vehicle 12. The term "circuit-switched" as used herein can mean a wireless call placed using a wireless carrier system 14 that sends and/or receives voice and/or data communications over the voice channel of that wireless call between the vehicle 12 and the central facility, such as the call center 20. While the circuit-switched telephone call may communicate through telephone circuit switches that are land-based, the term "circuit-switched" as used herein should also be read to include infrastructure used to carry wireless telephone calls as well. In one example, a vehicle occupant may command the vehicle telematics unit 30 to contact the call center 20. The vehicle telematics unit 30 can then place a circuit-switched call to the call center 20 over a particular wireless carrier system 14 and/or land network 16. Upon connecting with the call center 20 a variety of information and services can be provided to the vehicle occupant, such as turn-by-turn directions between two geographical locations. Or in another example, the call center 20 may contact the vehicle 12 and instruct the vehicle occupant to place the vehicle 12 in a particular configuration. Once the vehicle occupant puts the vehicle 12 in that configuration, the call center 20 may then want to transmit data for performing diagnostic analysis on the vehicle 12 that relates to the configuration of the vehicle 12. The method 200 proceeds to step 220.

At step 220, it is determined during the circuit-switched call that a separate packet data communication session between the telematics-equipped vehicle and the central facility is desired. Using the example above involving a request for turn-by-turn directions, the vehicle occupant may have requested some information from the call center 20 over the circuit-switched call, such as the turn-by-turn directions, that includes communicating data between the vehicle 12 and the call center 20. For instance, the vehicle occupant can request turn-by-turn directions between the present location of the vehicle 12 and a destination from the call center 20. And while the directions can be verbally conveyed to the vehicle occupant, it may be more convenient to send the directions as data to the vehicle 12 where they can be replayed as the vehicle 12 travels toward the destination and/or displayed as a map using some combination of the audio system 36, visual display 38, and GPS module 40. In this case, the turn-by-turn directions can be sent to the vehicle 12 via the wireless carrier system 14 as packetized data over a data channel that can be established separate from the circuit-switched telephone call. The method 200 proceeds to step 230.

At step 230, the identity of the wireless carrier system is obtained at the telematics-equipped vehicle from a local component of the wireless carrier system. In one example, this can be accomplished by obtaining an identifier, such as a system identification number (SID) or a network identification number (NID), at the vehicle 12 from a local component of the wireless carrier system 14. The SID or NID can be a code broadcast by the wireless carrier system 14 using a local component of that system 14, such as a base station or cell towers 70. The SID or NID can identify the wireless carrier system 14 in a particular area and is generally globally unique. The SID can identify all of the cell towers 70 or base stations that are part of a particular wireless carrier system 14

(e.g. Verizon Wireless) whereas the NID can identify a particular subset of base stations/cell towers 70 within the wireless carrier system 14. While the SID and NID are different, each may be used to identify a particular wireless carrier system 14. The vehicle telematics unit 30 can receive an identifier, such as the SID or NID, from the local component of the wireless carrier system 14 and transmit that identifier from the vehicle 12 to the call center 20 via the circuit-switched call. The wireless carrier system 14 can be identified at the call center 20 based on the transmitted identifier. The method 200 proceeds to step 240.

At step 240, the identified wireless carrier system 14 is queried from the call center 20 to determine whether the vehicle 12 is authorized to establish a packet-data communication session using the identified wireless carrier system 14. This query can include transmitting the identity of the vehicle 12 to the identified wireless carrier system 14 from the call center 20 along with a request to establish a packet-data communication session using the identified wireless carrier system 14. The identity of the vehicle 12 can be a vehicle identification number (VIN), a telematics unit identifier called a station identifier (STID), or some other alpha-numeric string of characters that uniquely identifies the vehicle 12 or vehicle telematics unit 30. The query, along with the identity of the vehicle 12, can be sent to the identified wireless carrier system 14 to determine whether the vehicle telematics device 30 has authorization to use the communication services of the identified wireless carrier system 14. This query can originate at the call center 20 and be sent using the land network 16. The wireless carrier system identifier discussed above, such as the SID/NID, can be used to direct the query from the call center 20 to the identified wireless carrier system 14. Once received by the identified wireless carrier system 14, it can pass the query to one or more portions of the identified wireless carrier system 14 that contain information used to authorize the packet data communication session, such as a home agent (HA), a foreign agent (FA), or an authentication, authorization, and accounting agent (AAA). The method 200 proceeds to step 250.

At step 250, an Internet protocol (IP) address is generated as a result of permitting a packet data communication session and is obtained from the identified wireless carrier system 14. Otherwise, a denial of service message can be sent from the identified wireless carrier system 14 to the call center 20. Assuming the identified wireless carrier system 14 determines that the vehicle 12 is permitted to communicate via the wireless carrier system 14 using a packet data communication session, the system 14 can generate an IP address to use for communicating the packetized data between the vehicle 12 and the call center 20. In one example, the identified wireless carrier system 14 can direct a packet-switched data network (PSDN; not shown) under the control of the identified wireless carrier system 14 to issue an IP address that the vehicle 12 can use to communicate with the call center 20. That IP address can be sent from the identified wireless carrier system 14 to the call center 20. After receiving the IP address, the call center 20 can send the IP address to the vehicle 12 over the circuit-switched telephone call. The call center 20 can then end the circuit-switched call and begin sending packetized data to the vehicle 12 via the identified wireless carrier system 14 using the IP address. It is also possible that the IP address can be accompanied by computer-readable instructions capable of being executed at the vehicle 12 that can instruct the vehicle 12 to contact the call center 20 using the sent IP address.

Optionally, the identified wireless carrier system 14 can send information describing the health of the system 14 to the call center 20 along with the IP address. For instance, if the vehicle 12 was authorized to communicate using the identified wireless carrier system 14, that system 14 still may not be able to carry the packetized data between the call center 20 and the base stations/cell towers near the vehicle 12 due to communications outages or other technical difficulties. In that case, the identified wireless carrier system 14 can alert the call center 20 of this status instead of or along with providing an IP address. If the identified wireless carrier system 14 sends the IP address even though that system 14 is experiencing difficulty, it may be possible that the call center 20 can be instructed to wait a period of time before contacting the vehicle 12. In another example, the identified wireless carrier system 14 could send a status alert indicating that the system 14 cannot carry packetized data instead of providing the IP address. The information included in the status alert can then be conveyed to the vehicle 12 from the call center 20. As noted above, after sending the IP address or alert to the vehicle 12, the call center 20 can then end the circuit-switched call. The method 200 proceeds to step 260.

At step 260, the exchange of data is commenced between the telematics-equipped vehicle 12 and the call center 20 using the obtained IP address. Once the call center 20 has transmitted the IP address to the vehicle 12, it can then send packetized data to the vehicle using that IP address. The vehicle 12 can then communicate packetized data over a data channel with the call center 20 using the PSDN. While this method 200 has been described using code division multiple access (CDMA) wireless technology, it should also be appreciated that other types of mobile broadband systems are possible and this method 200 is equally feasible with those systems. The method 200 then ends.

It is to be understood that the foregoing is a description of one or more preferred exemplary embodiments of the invention. The invention is not limited to the particular embodiments disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiments will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating with a telematics-equipped vehicle, comprising the steps of:
 (a) receiving a circuit-switched telephone call at a central facility from a telematics-equipped vehicle via a wireless carrier system that is in local communication with the telematics-equipped vehicle, wherein the central facility identifies the vehicle using a vehicle identifier;

(b) determining during the circuit-switched telephone call that a separate packet-data communication session between the telematics-equipped vehicle and the central facility is desired;

(c) identifying the wireless carrier system that is in local communication with the telematics-equipped vehicle using at least one of a system identification number (SID) or a network identification number (NID); then (d) querying the identified wireless carrier system from the central facility to determine whether the telematics-equipped vehicle is authorized to establish a packet-data communication session using the identified wireless carrier system;

when the central facility receives a response from the wireless carrier system indicating that the telematics-equipped vehicle is authorized, then:

(e) obtaining an Internet protocol (IP) address from the identified wireless carrier system based on the authorization; and (f) commencing the exchange of data via the separate packet-data communication session between the telematics-equipped vehicle and the central facility using the obtained IP address, and when the central facility receives a response from the identified wireless carrier system indicating that the telematics-equipped vehicle is not authorized, then:
receiving at the central facility an alert from the identified wireless carrier system informing the central facility that the identified wireless carrier system may be unable to communicate with the vehicle.

2. The method of claim 1, wherein the circuit-switched telephone call transmits voice and data communications over the voice channel of the circuit-switched telephone call between the telematics-equipped vehicle and the central facility.

3. The method of claim 1, wherein the wireless carrier system is identified by receiving an identifier at the telematics-equipped vehicle from a base station or a cell tower.

4. The method of claim 1, further comprising the step of sending the vehicle identifier from the central facility to the identified wireless carrier system.

5. The method of claim 1, further comprising the step of obtaining the IP address at the central facility from a packet switched data network (PSDN).

6. The method of claim 1, wherein the IP address is transmitted from the central facility to the vehicle using the circuit-switched telephone call.

7. The method of claim 1, wherein the circuit-switched telephone call is ended before the exchange of data is commenced using the obtained IP address.

8. A method of communicating with a telematics-equipped vehicle, comprising the steps of:
(a) placing a circuit-switched telephone call from a telematics-equipped vehicle to a central facility via a wireless carrier system that is in local communication with the telematics-equipped vehicle, wherein the central facility identifies the telematics-equipped vehicle using a vehicle identifier;
(b) determining during the circuit-switched telephone call that a separate packet-data communication session between the telematics-equipped vehicle and the central facility is desired;
(c) at the telematics-equipped vehicle, obtaining an identifier associated with the wireless carrier system from a local component of the wireless carrier system, wherein the wireless carrier system identifier is at least one of a system identification number (SID) or a network identification number (NID): then after obtaining the wireless carrier system identifier,
(d) transmitting the obtained wireless carrier system identifier from the telematics-equipped vehicle to the central facility via the circuit-switched telephone call; then
(e) when the central facility determines that the wireless carrier system authorizes packet data communications between the telematics-equipped vehicle and the central facility, receiving an Internet protocol (IP) address at the telematics-equipped vehicle, and commencing the exchange of data via the separate packet-data communication session between the telematics-equipped vehicle and the central facility using the received IP address; and
(f) when the wireless carrier system alerts the central facility of an absence of authorization, then no separate packet-data communication session is established between the telematics-equipped vehicle and the central facility such that no data exchange occurs.

9. The method of claim 8, wherein the circuit-switched telephone call transmits voice and data communications over the voice channel of the circuit-switched telephone call between the telematics-equipped vehicle and the central facility.

10. The method of claim 8, wherein the obtained wireless carrier system identifier is received at the telematics-equipped vehicle from a base station or a cell tower.

11. The method of claim 8, further comprising the step of transmitting the vehicle identifier from the central facility to the wireless carrier system.

12. The method of claim 8, further comprising the step of receiving the IP address at the central facility from a packet switched data network (PSDN) controlled by the wireless carrier system.

13. The method of claim 8, wherein the circuit-switched telephone call is ended before the exchange of data is commenced using the received IP address.

14. A method of communicating with a telematics-equipped vehicle, comprising the steps of:
(a) establishing a circuit-switched telephone call between a central facility and a telematics-equipped vehicle using a wireless carrier system that is in local communication with the telematics-equipped vehicle;
(b) determining at the central facility during the circuit-switched telephone call that a separate packet-data communication session between the telematics-equipped vehicle and the central facility is desired;
(c) receiving at the central facility a wireless carrier system identifier that is provided to the central facility from the telematics-equipped vehicle which acquired the wireless carrier system identifier from a local component of the wireless carrier system, wherein the wireless carrier system identifier includes a system identification number (SID) or a network identification number (NID);
(d) identifying the wireless carrier system at the central facility based on the transmitted SID or NID received from the telematics-equipped vehicle;
(e) when it is determined that the telematics-equipped vehicle is authorized to establish a packet-data communication session using the identified wireless carrier system, then determining the authorization includes steps (e1), (e2), and (e3), which include:
(e1) transmitting a telematics-equipped vehicle identifier to the identified wireless carrier system from the central facility along with a request to establish a packet-data communication session using the identified wireless carrier system; and (e2) receiving an Internet protocol (IP) address from the identified wireless carrier system that is generated as a result of the wireless carrier system permitting the request; and then (e3) commencing the exchange of data via the separate packet-data communication session between the telematics-equipped vehicle and the central facility using the obtained IP address; and (f) when it is determined that the telematics-equipped vehicle is not authorized to establish a packet-data communication session, then receiving at the central facility an alert from the identified wireless carrier system, wherein the alert indicates that the identified wireless carrier system may be unable to communicate with the vehicle.

15. The method of claim 14, wherein the circuit-switched telephone call is ended before the exchange of data is commenced using the obtained IP address.

* * * * *